US011558255B2

United States Patent
Lu et al.

(10) Patent No.: US 11,558,255 B2
(45) Date of Patent: Jan. 17, 2023

(54) LOGICAL NETWORK HEALTH CHECK IN SOFTWARE-DEFINED NETWORKING (SDN) ENVIRONMENTS

(71) Applicant: VMware, Inc., Palo Alto, CA (US)

(72) Inventors: Mengzhuo Lu, Newark, CA (US); Margaret Petrus, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 16/744,123

(22) Filed: Jan. 15, 2020

(65) Prior Publication Data

US 2021/0218630 A1    Jul. 15, 2021

(51) Int. Cl.
| | |
|---|---|
| *H04L 12/24* | (2006.01) |
| *H04L 41/0873* | (2022.01) |
| *H04L 41/22* | (2022.01) |
| *H04L 43/10* | (2022.01) |
| *H04L 41/0654* | (2022.01) |
| *H04L 43/0817* | (2022.01) |
| *H04L 41/0631* | (2022.01) |

(52) U.S. Cl.
CPC ........ *H04L 41/0873* (2013.01); *H04L 41/065* (2013.01); *H04L 41/0672* (2013.01); *H04L 41/22* (2013.01); *H04L 43/0817* (2013.01); *H04L 43/10* (2013.01)

(58) Field of Classification Search
CPC ... H04L 41/0873; H04L 41/065; H04L 41/22; H04L 41/0817; H04L 43/10
See application file for complete search history.

(56) References Cited

U.S. PATENT DOCUMENTS

| | | |
|---|---|---|
| 8,432,919 B2 | 4/2013 | Seren et al. |
| 8,462,786 B2 | 6/2013 | Liu et al. |
| 8,682,812 B1 | 3/2014 | Ranjan |

(Continued)

OTHER PUBLICATIONS

"Troubleshooting a Nonoperational Logical Switch and Corresponding Junos OS OVSDB-Managed VXLAN", Juniper Networks—Techlibrary, Feb. 23, 2018, Retrieved on Jan. 16, 2020 from the Internet at <URL: https://www.juniper.net/documentation/en_US/junos/topics/task/troubleshooting/sdn-ovsdb-non-operational-logical-switch-vxlan.html>.

(Continued)

*Primary Examiner* — Jonathan A Bui
*Assistant Examiner* — Kidest Mendaye
(74) *Attorney, Agent, or Firm* — Su IP Consulting

(57) ABSTRACT

Example methods and systems for logical network health check. One example may comprise obtaining network configuration information and network realization information associated with a logical network; processing the network configuration information and the network realization information to determine the following: (a) network configuration health information specifying a network configuration issue and a first remediation action; and (b) network realization health information specifying a network realization issue and a second remediation action; and providing, to a user device, multiple user interfaces (UIs) specifying the first health information and the second health information along with a visualization of the logical network. In response to detecting an instruction initiated by the user device using at least one of the multiple UIs, the first remediation action or the second remediation action may be performed.

21 Claims, 6 Drawing Sheets

(56) References Cited

U.S. PATENT DOCUMENTS

| | | | | |
|---|---|---|---|---|
| 9,800,470 | B2* | 10/2017 | Agarwal | .................. H04L 41/08 |
| 10,305,809 | B2 | 5/2019 | Stepanek et al. | |
| 10,348,767 | B1* | 7/2019 | Lee | ..................... H04L 63/1416 |
| 10,375,090 | B2 | 8/2019 | McGrew et al. | |
| 10,498,752 | B2 | 12/2019 | Di Pietro et al. | |
| 10,530,740 | B2* | 1/2020 | Jana | ......................... H04L 43/08 |
| 10,560,309 | B1* | 2/2020 | Chitalia | ................ H04L 41/069 |
| 10,623,285 | B1* | 4/2020 | Shevade | ............. H04L 43/0817 |
| 10,673,765 | B2 | 6/2020 | Ma | |
| 10,798,015 | B2* | 10/2020 | Rao | ......................... H04L 67/12 |
| 10,868,742 | B2* | 12/2020 | Chitalia | .............. H04L 43/0876 |
| 10,897,474 | B2 | 1/2021 | Anderson et al. | |
| 11,018,943 | B1 | 5/2021 | Vasseur et al. | |
| 11,079,744 | B2* | 8/2021 | Chauvet | ........... G05B 19/41865 |
| 11,271,824 | B2 | 3/2022 | Khetarpal et al. | |
| 11,271,833 | B2 | 3/2022 | Komarek et al. | |
| 2011/0004914 | A1* | 1/2011 | Ennis, Jr. | ............ H04L 41/0853 |
| | | | | 726/1 |
| 2014/0215077 | A1* | 7/2014 | Soudan | ................. H04L 47/822 |
| | | | | 709/226 |
| 2014/0280834 | A1* | 9/2014 | Medved | .............. H04L 41/0609 |
| | | | | 709/223 |
| 2016/0219068 | A1 | 7/2016 | Lee et al. | |
| 2016/0283859 | A1 | 9/2016 | Fenoglio et al. | |
| 2018/0114126 | A1 | 4/2018 | Das et al. | |
| 2018/0123903 | A1* | 5/2018 | Holla | ..................... H04L 45/02 |
| 2018/0189677 | A1 | 7/2018 | Anderson et al. | |
| 2018/0367412 | A1* | 12/2018 | Sethi | ................... H04L 41/0853 |
| 2018/0367413 | A1* | 12/2018 | Kompella | ................ H04L 41/22 |
| 2019/0044869 | A1 | 2/2019 | Wang et al. | |
| 2019/0044913 | A1 | 2/2019 | Tanida et al. | |
| 2019/0190938 | A1 | 6/2019 | Oba et al. | |
| 2021/0021491 | A1 | 1/2021 | Pasha et al. | |
| 2021/0067455 | A1 | 3/2021 | Lahtiranta et al. | |
| 2021/0075799 | A1 | 3/2021 | Pularikkal et al. | |
| 2021/0204152 | A1 | 7/2021 | Vasudevan et al. | |
| 2022/0086064 | A1 | 3/2022 | Sivaraman et al. | |

OTHER PUBLICATIONS

"Logical Network System Events", VMware NSX Data Center for vSphere 6.4, Last Updated May 31, 2019, Retrieved on Jan. 16, 2020 from the Internet at <URL: https://docs.vmware.com/en/VMware-NSX-Data-Center-for-vSphere/6.4/com.vmware.nsx.logging.doc/GUID-8342573F-797E-4599-947D-CCA3AB794F13.html>.

"Application of Machine Learning to Flow-based Network Monitoring", Network Polygraph, Retrieved on Jan. 16, 2020 from the Internet at <URL: https://datatracker.ietf.org/meeting/95/materials/slides-95-nmlrg-1>.

"Intermapper Flows—Reliable NetFlow Monitoring Software Shows You Top Talkers and Listeners for Clear Answers About Traffic Flow", Help System, Retrieved on Jan. 16, 2020 from the Internet at <URL: https://www.helpsystems.com/products/intermapper-flows>.

Alienor, "Virtualization Monitoring: How to Gain Visibility into Your Virtual Environment", Plixer, Retrieved on Jan. 16, 2020 from the Internet at <URL: https://www.plixer.com/blog/network-traffic-analysis/virtualization-monitoring/.

"Analysis of Network Connection Data with Azure Monitor for Virtual Machines", Virtual Machines Blog, Mar. 27, 2019, Retrieved on Jan. 16, 2020 from the Internet at <URL: https://azure.microsoft.com/en-in/blog/analysis-of-network-connection-data-with-azure-monitor-for-virtual-machines/>.

Dirk Wallerstorfer, "Detecting Network Erros and Their Impact on Services", Dynatrace Blog, Dec. 14, 2015, Retrieved on Jan. 16, 2020 from the Internet at <URL: https://www.dynatrace.com/news/blog/detecting-network-errors-impact-on-services/>.

Non-Published Commonly Owned U.S. Appl. No. 16/744,131, filed Jan. 15, 2020, 34 pages, VMware.

Shou-Chieh Chao et al., "Flow Classification for Software-Defined Data Centers Using Stream Mining", IEEE Transactions on Services Computing, Jan./Feb. 2019, pp. 105-pp. 116, vol. 12, No. 1.

B. Indira et al., "An Approach to Enhance Packet Classification Performance of Software-Defined Network Using Deep Learning", Soft Computing, Apr. 10, 2019, pp. 8609-pp. 8619.

* cited by examiner

LOGICAL NETWORK HEALTH CHECK IN SOFTWARE-DEFINED NETWORKING (SDN) ENVIRONMENTS

CROSS-REFERENCE TO RELATED APPLICATION

The present U.S. patent application Ser. No. 16/744,123 is related in subject matter to U.S. patent application Ser. No. 16/744,131, filed on Jan. 15, 2020, and entitled "SELF-LEARNING PACKET FLOW MONITORING IN SOFTWARE-DEFINED NETWORKING ENVIRONMENTS", which is incorporated herein by reference.

BACKGROUND

Virtualization allows the abstraction and pooling of hardware resources to support virtual machines in a software-defined networking (SDN) environment, such as a software-defined data center (SDDC). For example, through server virtualization, virtual machines running different operating systems may be supported by the same physical machine (also referred to as a "host"). Each virtual machine is generally provisioned with virtual resources to run an operating system and applications. The virtual resources may include central processing unit (CPU) resources, memory resources, storage resources, network resources, etc. Since various network issues may affect traffic among VMs deployed in the SDN environment, it is desirable to perform network troubleshooting and diagnosis to identify those issues.

DETAILED DESCRIPTION

Figure 1:
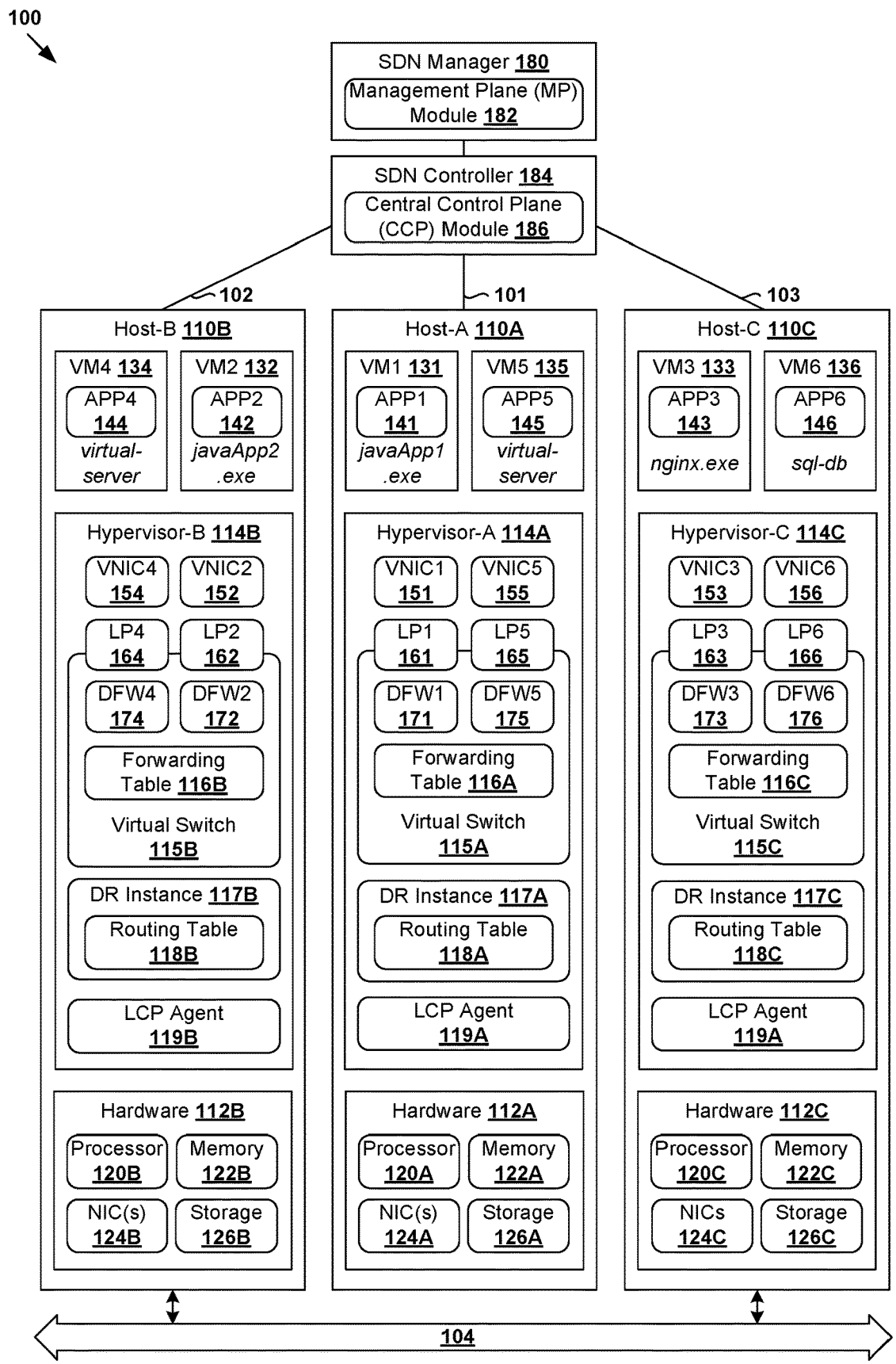
FIG. 1 is a schematic diagram illustrating an example software-defined networking (SDN) environment in which logical network health check may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein. Although the terms "first" and "second" are used throughout the present disclosure to describe various elements, these elements should not be limited by these terms. These terms are used to distinguish one element from another. For example, a first element may be referred to as a second element, and vice versa.

Challenges relating to network troubleshooting and diagnosis will now be explained in more detail using FIG. 1, which is a schematic diagram illustrating example software-defined networking (SDN) environment 100 in which logical network health check may be performed. Depending on the desired implementation, SDN environment 100 may include additional and/or alternative components than that shown in FIG. 1. SDN environment 100 includes multiple hosts 110A-C that are inter-connected via physical network 104. In practice, SDN environment 100 may include any number of hosts (also known as a "host computers", "host devices", "physical servers", "server systems", "transport nodes," etc.), where each host may be supporting tens or hundreds of virtual machines (VMs).

Each host 110A/110B/110C may include suitable hardware 112A/112B/112C and virtualization software (e.g., hypervisor-A 114A, hypervisor-B 114B, hypervisor-C 114C) to support various VMs. For example, hosts 110A-C may support respective VMs 131-136 (see also FIG. 2). Hypervisor 114A/114B/114C maintains a mapping between underlying hardware 112A/112B/112C and virtual resources allocated to respective VMs. Hardware 112A/112B/112C includes suitable physical components, such as central processing unit(s) (CPU(s)) or processor(s) 120A/120B/120C; memory 122A/122B/122C; physical network interface controllers (NICs) 124A/124B/124C; and storage disk(s) 126A/126B/126C, etc.

Virtual resources are allocated to respective VMs 131-136 to support a guest operating system (OS) and application(s). For example, VMs 131-136 support respective applications 141-146 (see "APP1" to "APP6"). The virtual resources may include virtual CPU, guest physical memory, virtual disk, virtual network interface controller (VNIC), etc. Hardware resources may be emulated using virtual machine monitors (VMMs). For example in FIG. 1, VNICs 151-156 are virtual network adapters for VMs 131-136, respectively, and are emulated by corresponding VMMs (not shown for simplicity) instantiated by their respective hypervisor at respective host-A 110A, host-B 110B and host-C 110C. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-C may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B/114C implements virtual switch 115A/115B/115C and logical distributed router (DR) instance 117A/117B/117C to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-C and represented internally using forwarding tables 116A-C at respective virtual switches 115A-C. Forwarding tables 116A-C may each include entries that collectively implement the respective logical switches. Further, logical DRs that provide logical layer-3 connectivity may be implemented collectively by DR instances 117A-C and represented internally using routing tables 118A-C at respective DR instances 117A-C. Routing tables 118A-C may each include entries that collectively implement the respective logical DRs.

Packets may be received from, or sent to, each VM via an associated logical port. For example, logical switch ports 161-166 (see "LP1" to "LP6") are associated with respective VMs 131-136. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-C in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of a corresponding virtualized computing instance (e.g., when the source host and destination host do not have a distributed virtual switch spanning them).

To protect VMs 131-136 against security threats caused by unwanted packets, hypervisors 114A-C may implement firewall engines to filter packets. For example, distributed firewall engines 171-176 (see "DFW1" to "DFW6") are configured to filter packets to, and from, respective VMs 131-136 according to firewall rules. In practice, network packets may be filtered according to firewall rules at any point along a datapath from a VM to corresponding physical NIC 124A/124B/124C. In one embodiment, a filter component (not shown) is incorporated into each VNIC 151-156 that enforces firewall rules that are associated with the endpoint corresponding to that VNIC and maintained by respective distributed firewall engines 171-176.

Through virtualization of networking services in SDN environment 100, logical networks (also referred to as overlay networks or logical overlay networks) may be provisioned, changed, stored, deleted and restored programmatically without having to reconfigure the underlying physical hardware architecture. A logical network may be formed using any suitable tunneling protocol, such as Virtual eXtensible Local Area Network (VXLAN), Stateless Transport Tunneling (STT), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer 2 physical networks.

SDN manager 180 and SDN controller 184 are example network management entities in SDN environment 100. One example of an SDN controller is the NSX controller component of VMware NSX® (available from VMware, Inc.) that operates on a central control plane. SDN controller 184 may be a member of a controller cluster (not shown for simplicity) that is configurable using SDN manager 180 operating on a management plane (MP). Network management entity 180/184 may be implemented using physical machine(s), VM(s), or both. Logical switches, logical routers, and logical overlay networks may be configured using SDN controller 184, SDN manager 180, etc. To send or receive control information, a local control plane (LCP) agent (not shown) on host 110A/110B/110C may interact with central control plane (CCP) module 186 at SDN controller 184 via control-plane channel 101A/101B/101C.

Hosts 110A-C may also maintain data-plane connectivity among themselves via physical network 104 to facilitate communication among VMs located on the same logical overlay network. Hypervisor 114A/114B/114C may implement a virtual tunnel endpoint (VTEP) (not shown) to encapsulate and decapsulate packets with an outer header (also known as a tunnel header) identifying the relevant logical overlay network (e.g., using a VXLAN or "virtual" network identifier (VNI) added to a header field). For example in FIG. 1, hypervisor-A 114A implements a first VTEP associated with (IP address=IP-A, MAC address=MAC-A, VTEP label=VTEP-A), hypervisor-B 114B implements a second VTEP with (IP-B, MAC-B, VTEP-B), hypervisor-C 114C implements a third VTEP with (IP-C, MAC-C, VTEP-C), etc. Encapsulated packets may be sent via an end-to-end, bi-directional communication path (known as a tunnel) between a pair of VTEPs over physical network 104.

In practice, traffic among of VMs 131-136 may be affected by various network issues in SDN environment 100. Conventionally, troubleshooting tools may be used to diagnose network issues affecting VMs 131-136. However, these tools usually necessitate users to have detected a network issue in SDN environment 100, as well as some idea as to where the network issue originates. For example, these tools may require a user to select two VMs or VNICs to visualize or test topology connectivity between two endpoints. When troubleshooting is required, a user might have to visit different appliances and familiarize with different troubleshooting tools to be able to debug network issues.

Logical Network Health Check

According to examples of the present disclosure, logical network health checks may be implemented to facilitate network troubleshooting and diagnosis. In particular, logical network health check may be performed to identify configuration and realization issues associated with a logical network to assess whether the logical network is behaving as expected. As SDN environment 100 increases in scale and complexity, any improvement in network troubleshooting and diagnosis may lead to reduced system downtime and better performance.

Figure 2:
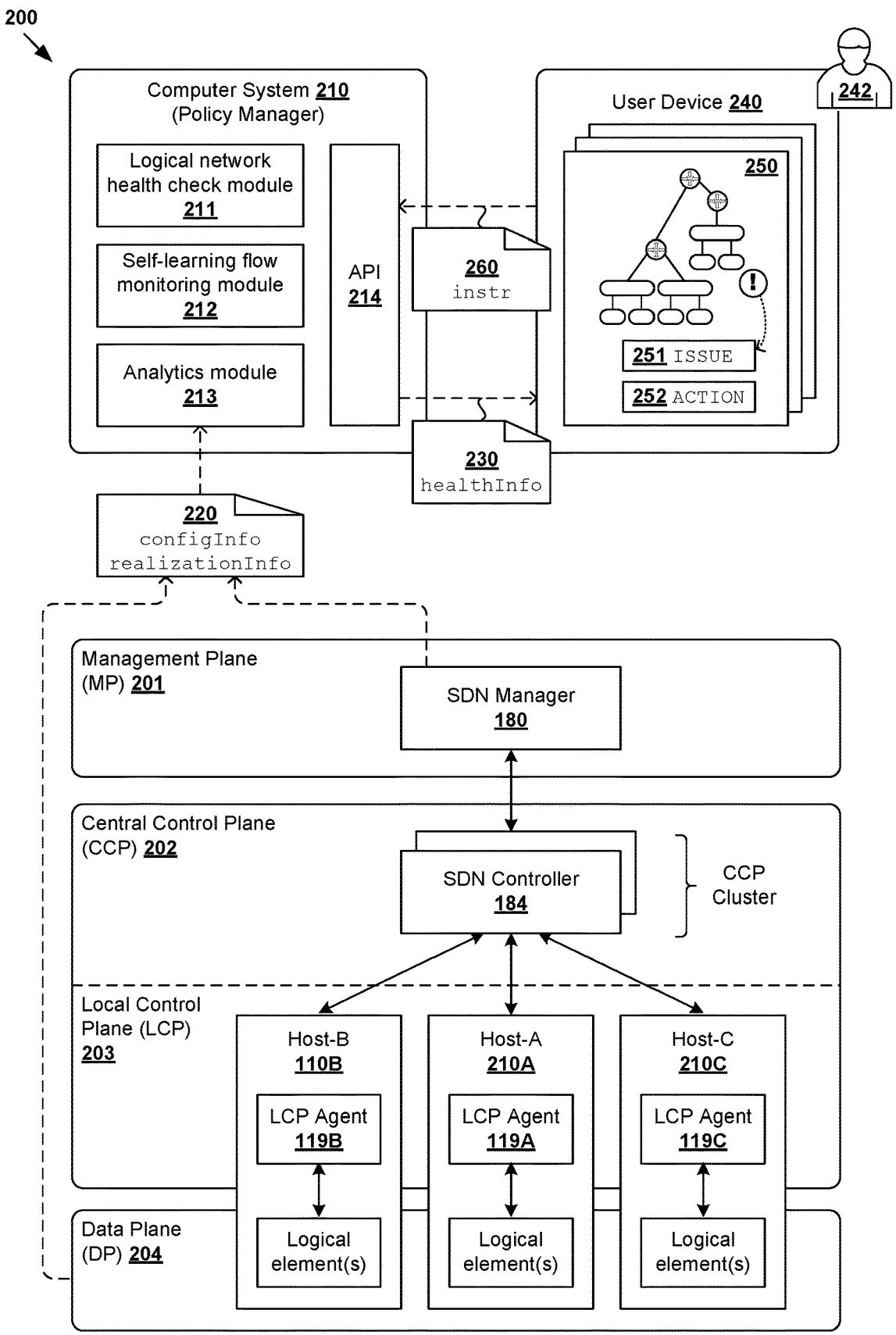
FIG. 2 is a schematic diagram illustrating an example system architecture for logical network health check in an SDN environment.

In more detail, FIG. 2 is a schematic diagram illustrating example architecture 200 for logical network health check in SDN environment 100 in FIG. 1. It should be understood that, depending on the desired implementation, example architecture 200 may include additional and/or alternative components than that shown in FIG. 2. Example architecture 200 may include policy manager 210 capable of interacting with various entities in SDN environment 100, such as SDN manager 180 (see MP 201), SDN controller 184 (see CCP 202), hosts 110A-C on data plane 204 and user device(s) 240 operated by user(s) 242.

Policy manager 210 may represent a configuration layer that interacts with SDN manager 180 representing a realization layer in SDN environment 100. User(s) 242 operating with client device(s) 240 may interact with policy manager 210 to perform network configurations, which are then realized on hosts 110A-C via SDN manager 180. Any suitable UI may be supported by policy manager 210 using application programming interface (API) module 214, such as graphical user interface (GUI), command-line interface (CLI), representational state transfer (REST) API, etc.

Policy manager 210 may support any suitable module(s) to facilitate policy configuration as well as network troubleshooting and diagnosis. For example, policy manager 210 may include logical network health check module 211, self-learning packet flow monitoring module 212, analytics module 213 and API module 214. Policy manager 210 may be configured to monitor packet flows among VMs 131-136 periodically (e.g., every five minutes) using analytics module 213, which interacts with context engines (not shown) implemented by respective hosts 110A-C.

According to examples of the present disclosure, policy manager 210 ("computer system") may facilitate logical network health check in SDN environment 100. An example will be explained using FIG. 3, which is a flowchart of example process 300 for a computer system to perform logical network health check in SDN environment 100. Example process 300 may include one or more operations, functions, or actions illustrated by one or more blocks, such as 310 to 360. The various blocks may be combined into fewer blocks, divided into additional blocks, and/or eliminated depending on the desired implementation.

Figure 3:
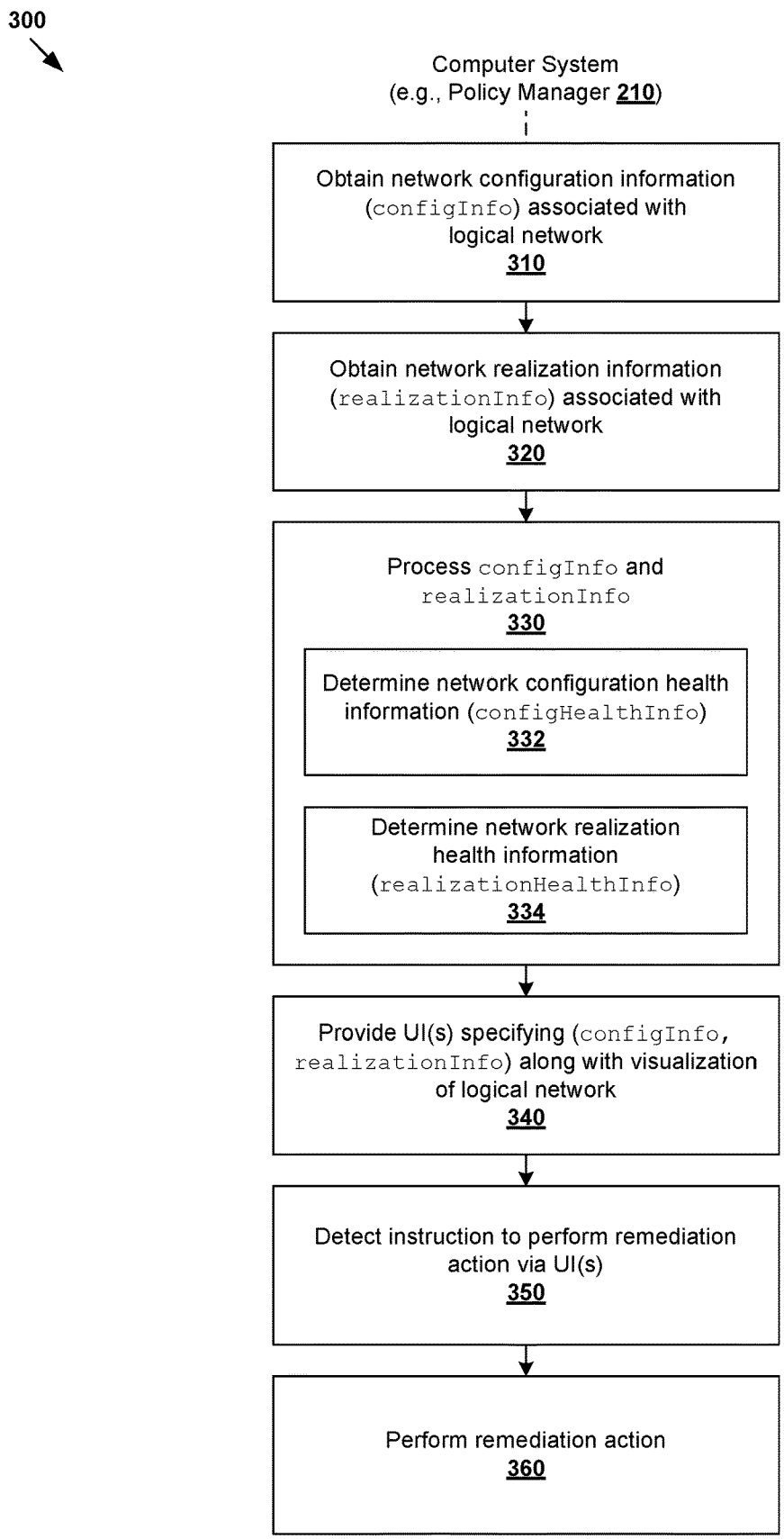
FIG. 3 is a flowchart of an example process for a computer system to perform logical network health check in an SDN environment.

At 310 and 320 in FIG. 3, network configuration information (configInfo) and realization information (realizationInfo) may be obtained. Here, the term "obtain" may refer generally to receiving or retrieving information from a source (e.g., host 110A/110B/110C) or datastore in which the information is stored. In the example in FIG. 2, blocks 310-320 may involve analytics module 213 obtaining the configuration information and realization information (see 220) from hosts 110A-C and/or SDN manager 180. The network configuration information may identify configuration(s) associated with a logical network on which VMs 131-136 are deployed. The network realization information may identify how the multiple configurations are realized in the logical network, particularly how they are implemented by hosts 110A-C.

At 330 in FIG. 3, network configuration health information (configHealth) and network realization information (realizationHealth) associated with the logical network may be determined. Block 330 may involve processing the network configuration information and network realization information. Here, the term "processing" may include any suitable operation(s), such as information analysis, matching with rule(s) or condition(s), classification, identifying anomaly or anomalies, etc. The configuration health information (see 332) may specify a configuration issue associated with the logical network and a first remediation action responsive to the configuration issue. The realization health information (see 334) may specify a realization issue associated with the logical network and a second remediation action responsive to the realization issue.

At 340 in FIG. 3, multiple UIs specifying the network configuration health information and the network realization health information (see 230 in FIG. 2) may be provided to user device 240 along with a visualization of the logical network. As will be described using FIGS. 4-6, the visualization may include a logical network topology graph illustrating VMs 131-136 and how they are connected via logical ports 161-166, logical switch(es), logical router(s), etc. For example in FIG. 2, UI 250 may specify network configuration and/or realization issues (see 251) and associated remediation actions (see 252).

At 350 and 360 in FIG. 3, in response to detecting an instruction initiated by user device 240 using at least one of the multiple UIs, the first remediation action (see 332) and/or the second remediation action (see 334) may be performed. Here, the term "provide" may refer generally to generating and sending any suitable information to cause user device 240 to render UI(s) on a display screen. The UIs may form part of a wizard for in-context, step-based logical network health check to improve network troubleshooting and diagnosis in SDN environment 100. See also 260 in FIG. 2. Depending on the desired implementation, the term "in-context" may mean that the information provided is understandable from a high-level overview of SDN environment 100. This way, it is not necessary for user(s) 242 to apply different tools on different parts of SDN environment 100 for network troubleshooting and diagnosis.

In one example, the first remediation action may include reconfiguring one of VMs 131-136 and/or a logical element on the logical network to resolve a configuration issue affecting the logical element. In another example, the second remediation action may include resolving a realization issue in the form of an inconsistency between a configured attribute and a realized attribute associated with one of VMs 131-136 and/or a logical element. As used herein, the term "logical element" or "logical forwarding element" may refer generally to a logical entity that is deployed on a datapath to connect a pair of endpoints (e.g., VM1 131 and VM6 136), such as a logical switch port, logical switch, logical router port, logical router, edge appliance, VNIC, etc.

Using examples of the present disclosure, policy manager 210 may allow users 242 to review a visualization of the logical network and health information, gain insights as to whether the logical network is behaving as expected during runtime and initiate a remediation action to resolve any issues identified by policy manager 210. Unlike conventional debugging tools, examples of the present disclosure may be implemented without necessitating users to have any prior knowledge of network issues and pinpoint where exactly they might occur. In the following, various examples will be discussed using FIG. 4 to FIG. 6.

Network Configuration Health Check

Example network configuration health checks will be described using FIG. 4, which is a schematic diagram illustrating example network configuration health check 400 in SDN environment 100. In this case, policy manager 210 may generate and send information to user device 240 to provide network configuration check interface 410 to display a topology graph associated with a logical network for which health check is required. The logical network may be associated with a policy domain under the control and management of policy manager 210 and user 242.

Figure 4:
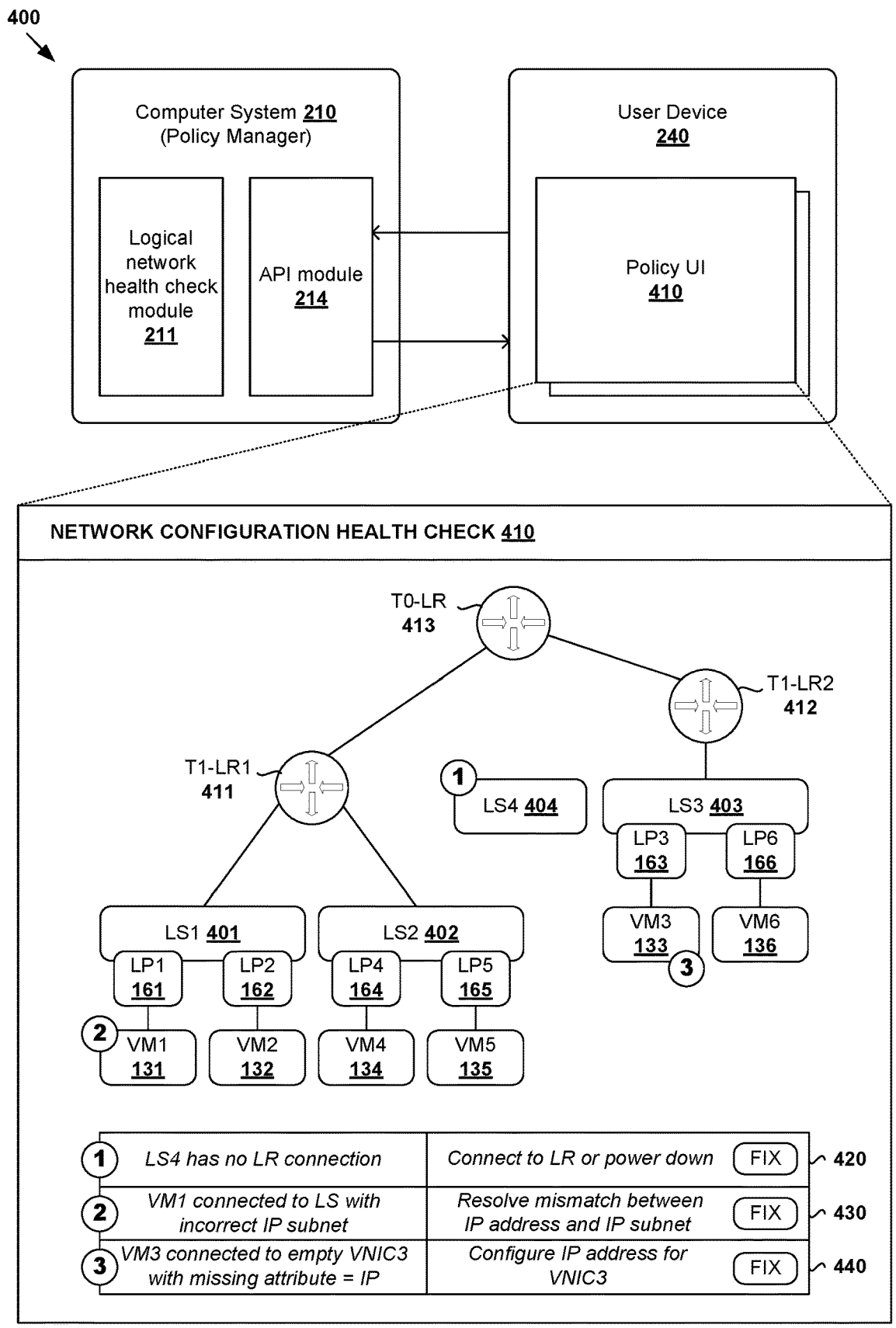
FIG. 4 is a schematic diagram illustrating an example network configuration health check in an SDN environment.

In the example in FIG. 4, a topology graph associated with a logical network connecting VMs 131-136 is shown. The logical network may include logical switches 401-404. First, LS1 401 may be deployed to provide layer-2 connectivity to VM1 131 and VM3 132 in a first broadcast domain. VM1 131 and VM2 132 are connected to LS1 401 via respective LP1 161 and LP2 162. Second, LS2 402 may be deployed to provide layer-2 connectivity to VM4 134 and VM5 135 in a second broadcast domain. VM4 134 and VM5 135 are connected to LS2 402 via respective LP4 164 and LP5 165. Third, LS2 403 may be deployed to provide layer-2 connectivity to VM3 133 and VM6 136 in a third broadcast domain. VM3 133 and VM6 136 are connected to LS3 403 via respective LP3 163 and LP6 166.

Depending on the desired implementation, there may be multiple logical routers residing on different tiers. In practice, a multi-tier logical network topology may be used to isolate multiple tenants. For example, a two-tier topology includes an upper tier (i.e., tier-0) associated with a provider logical router (PLR) and a lower tier (i.e., tier-1) associated with a tenant logical router (TLR). In this case, a logical router may be a tier-0 or tier-1 logical router. In the example in FIG. 4, one tier-1 logical router=T1-LR1 411 may be deployed to provide layer-3 connectivity to logical switches 401-402. T1-LR2 412 connects LS3 403 to T1-LR1 411 via tier-0 logical router=T0-LR 413. In practice, tier-1 logical routers 411-412 may be associated with the different data center tenants. T0-LR 413 may act as gateway between internal logical network and external networks, and also responsible for bridging different tier-1 logical routers.

(a) Lonely Logical Element(s)

At 420 in FIG. 4, policy manager 210 may identify configuration issue=lonely logical element in that a logical element does not have any connection to any other logical element (e.g., logical router). Using lonely switch=LS4 404 as an example, any VMs (not shown) connected to LS4 404 might lose connectivity with the rest of the network. In practice, this is a common configuration mistake that is generally difficult to debug using conventional tools.

If lonely switch=LS4 404 is in use, policy manager 210 may suggest first remediation action=connect the lonely switch to a logical router (e.g., T1-LR2 412) and highlight the issue on network configuration health check UI 410. Otherwise, remediation action=power down may be performed if the lonely switch is not in use. Example UI 410 may include UI elements (see "FIX") to request for an instruction to perform the suggested remediation action.

(b) Incorrect Network Connection

At 430 in FIG. 4, policy manager 210 may identify configuration issue=incorrect connection of between a pair of logical elements, such as a VM (e.g., VM1 131) that is connected to a wrong logical switch. This cause the VM to be assigned an IP address that does not belong to a desired IP subnet, leading to possible communication failures. The issue may be identified based on the VM's configured IP address and IP subnet (e.g., from logical router's configuration). In response to detecting the issue, policy manager 210 may suggest first remediation action=resolve the mismatch between the IP address and IP subnet configuration.

(c) Missing Configuration

At 440 in FIG. 4, policy manager 210 may identify configuration issue=missing attribute information associated with a logical element based on configuration information associated with the logical element. For example, an empty VNIC (e.g., VNIC3 153) that does not have any IP address configuration (e.g., attribute=IP address) may be identified, which affects the connectivity of the associated VM (e.g., VM3 133). In response to detecting the issue, policy manager 210 may suggest first remediation action=configure the attribute associated with the logical element.

Network Realization Health Check

Example network realization health checks will be described using FIG. 5, which is a schematic diagram illustrating example network realization health check 500 in SDN environment 100. The example in FIG. 5 also includes a topology graph (see 510) of the logical network discussed using FIG. 4. Description of logical elements 161-166, logical switches 401-403 and logical routers 411-413 is also applicable here and will not be repeated for brevity.

(a) Inconsistent IP Configuration

When pushing DFW rules to hosts 110A-C, a logical port's IP address binding is used. Such address binding may be discovered using address resolution protocol (ARP) snooping, dynamic host configuration protocol (DHCP) snooping or based user's configuration. For example, when user 242 configures a DFW rule for VM1 131 via SDN manager 180, the DFW rule will be pushed towards the data plane using an IP address associated with LP1 161. However, the DFW rule might be "missed" and therefore not enforced on traffic forwarded via LP1 161 and VNIC1 151 during runtime. In some cases, user 242 might be very confused by their ineffective DFW rules and have no clue as to how to start troubleshooting.

Figure 5:
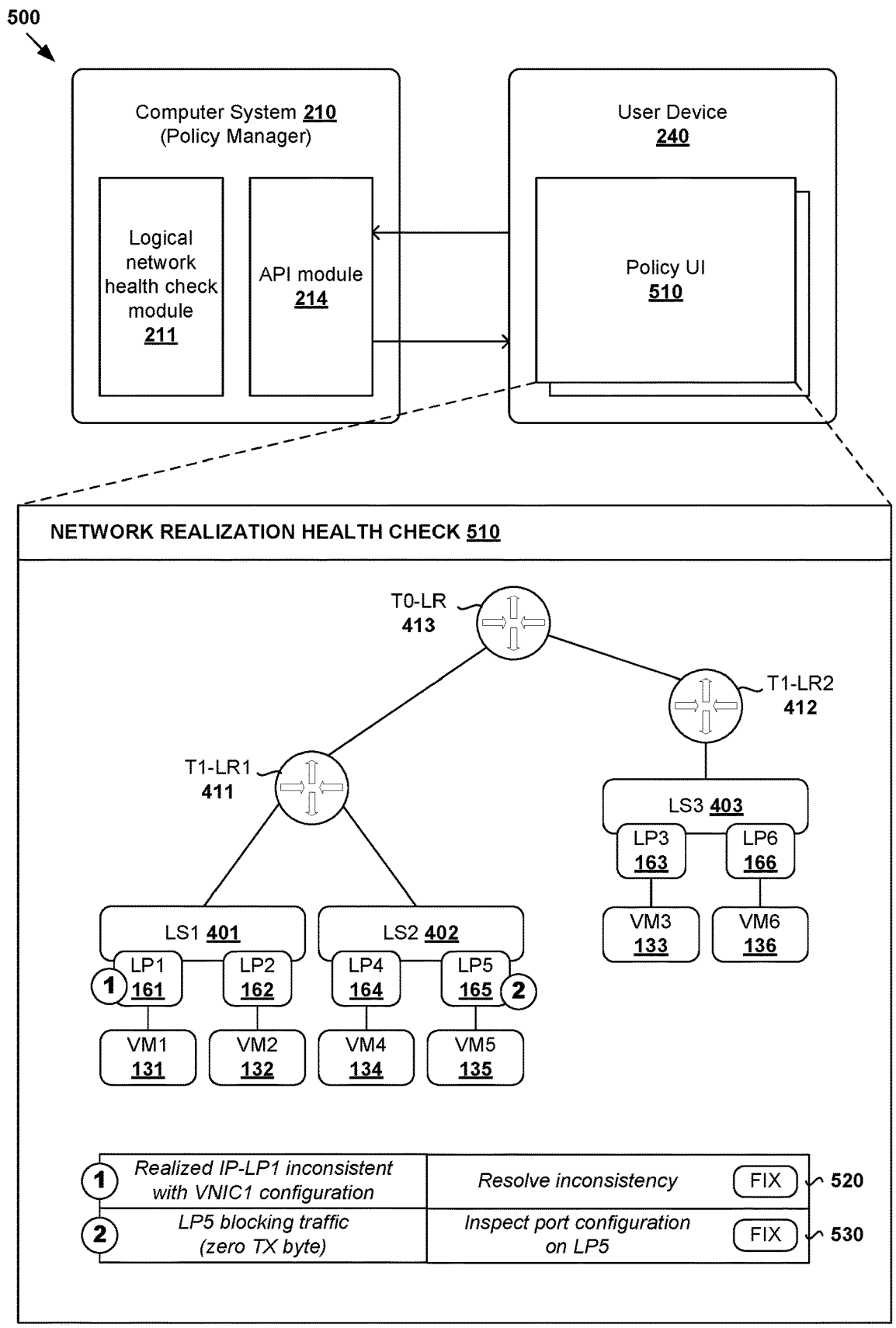
FIG. 5 is a schematic diagram illustrating an example network realization health check in an SDN environment.

In this case, at 520 in FIG. 5, policy manager 210 may identify realization issue=inconsistency between VNIC configuration IP address (e.g., IP-VNIC1=169.168.40.2) and logical port realization IP (e.g., IP-LP1=169.254.149.166). This will cause the DFW rule to be "bypassed" because the IP-LP1 of LP1 161 gets pushed down to the data plane while the communication from VM1 131 is addressed to IP-VNIC1 of VNIC1 151. The issue affects VM1 131 because the DFW rule is not translated correctly to the data plane and therefore not enforced. To resolve the issue, policy manager 210 may suggest second remediation action=resolve the inconsistency, update a switching profile for LP1 161 and/or increase ARP binding limit for LP1 161. UI elements (see "FIX") are provided to request for instruction(s) to perform the suggested remediation action.

(b) Blocking Logical Element(s)

At 530 in FIG. 5, policy manager 210 may identify realization issue=blocking logical element (e.g., logical port=LP5 165) that does not have any transmitting and/or receiving traffic. The issue may be identified by inspecting metric information associated with the logical network on which VMs 131-136 are deployed, including that of logical ports, logical switches and logical routers. In response to detecting the issue, policy manager 210 may suggest second remediation action=inspect port configuration on LP5 165.

Performance Health Check

Example performance health checks will be described using FIG. 6, which is a schematic diagram illustrating example performance health check 600 in SDN environment 100. The example in FIG. 6 also includes a topology graph (see 610) of the logical network discussed using FIG. 4. In this case, policy manager 210 may identify a performance issue by comparing a configured (or expected) performance metric and a realized performance metric. Any suitable performance metric information may be used, such as CPU utilization, memory utilization, number of packets transmitted (TX) and received (RX), amount of TX and RX data (bytes), etc.

Figure 6:
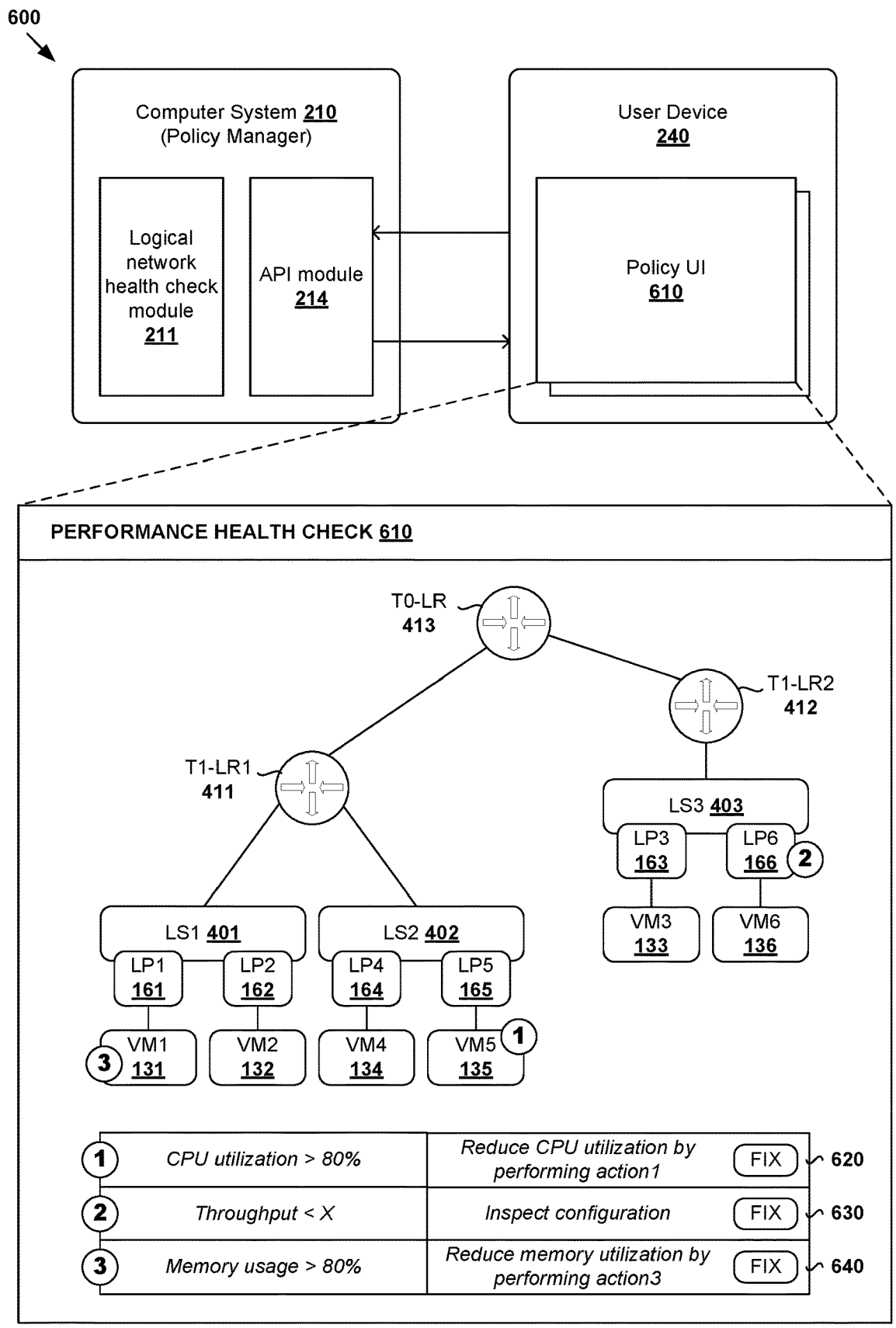
FIG. 6 is a schematic diagram illustrating an example network performance health check in an SDN environment.

At 620 in FIG. 6, policy manager 210 may identify performance issue="CPU utilization>threshold" (e.g., 80%) for VM5 135. In this case, policy manager 210 may suggest a remediation action to reduce CPU utilization. At 630 in FIG. 6, policy manager 210 may identify performance issue="throughput<threshold" (e.g., X) for LP6 166. In this case, a remediation action to inspect limiting configuration at LP6 166 may be suggested. At 640 in FIG. 6, policy manager 210 may identify performance issue="memory utilization>threshold" (e.g., 80%) for VM1 131. In this case, a remediation action to reduce memory utilization may be suggested.

In practice, there may be hundreds or thousands of logical routers and logical switches, as well as tens of thousands of logical switch ports. At a particular instance during runtime, there might be a large number of packets travelling between different endpoints to facilitate various applications. In some cases, packets might be dropped at various locations in a logical network due to various reasons. Using examples of the present disclosure, an in-context, one-stop and step-based health check and troubleshooting tool that includes example UIs in FIGS. 4-6 may be implemented. The tool may be used to walk users through logical network configuration, visualize network issues associated with the logical network configuration and suggest remediation action(s) to improve usability and security.

Container Implementation

Although explained using VMs 131-136, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 6, container technologies may be used to run various containers inside respective VMs 131-136. Containers are "OS-less", meaning that they do not include any OS that could weigh 10 s of Gigabytes (GB). This makes containers more lightweight, portable, efficient and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 6. For example, a computer system capable of acting as policy manager 210 or classification system 220 may be deployed in SDN environment 100.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a computer system to perform logical network health check, the method comprising:
  obtaining network configuration information identifying multiple configurations associated with a logical network on which multiple virtualized computing instances are deployed;
  obtaining network realization information identifying how the multiple configurations are realized on multiple hosts supporting the logical network and the multiple virtualized computing instances;
  processing the network configuration information and the network realization information to determine:
    (a) network configuration health information specifying a network configuration issue associated with the logical network and a first remediation action; and (b) network realization health information specifying a network realization issue associated with the logical network and a second remediation action, wherein the network realization issue includes an inconsistency between a configured attribute for the logical network and a realized attribute for the logical network;

providing, to a user device, first and second user interfaces (UIs) to respectively display the network configuration health information and the network realization health information along with corresponding first and second network topology graphs that provide a visualization of the logical network, wherein the first and second network topology graphs illustrate the multiple virtualized computing instances and how the multiple virtualized computing instances are connected via logical elements deployed on the logical network, wherein the first network topology graph shows a first location of the network configuration issue in the logical network, and wherein the second network topology graph shows a second location of the network realization issue in the logical network; and in response to detecting an instruction initiated by the user device using the first UI or the second UI, respectively performing the first remediation action or the second remediation action.

2. The method of claim 1, wherein processing the network configuration information and the network realization information comprises:

determining the network configuration health information that specifies the network configuration issue affecting one of the multiple virtualized computing instances or a logical element amongst the logical elements deployed on the logical network, wherein the logical element is a logical switch, a logical switch port, a logical router, or a logical router port.

3. The method of claim 2, wherein performing the first remediation action comprises:

reconfiguring the logical element affected by the network configuration issue in the logical network.

4. The method of claim 1, wherein the inconsistency between the configured attribute for the logical network and the realized attribute for the logical network comprises:

an inconsistency between a configured attribute and a realized attribute associated with one of the multiple virtualized computing instances or a logical element amongst the logical elements deployed on the logical network.

5. The method of claim 4, wherein performing the second remediation action comprises:

resolving the inconsistency between the configured attribute and the realized attribute associated with the one of the multiple virtualized computing instances or the logical element deployed on the logical network.

6. The method of claim 1, wherein processing the network configuration information and the network realization information comprises:

determining the network realization health information specifying the realization issue as a connectivity issue between a first virtualized computing instance and a second virtualized computing instance that are connected via the logical elements deployed on the logical network.

7. The method of claim 1, wherein providing the first and second UIs comprises at least one of:

providing the first UI to display a warning of the network configuration issue on the visualization of the logical network along with a request for the instruction to perform the first remediation action; and providing the second UI to display a warning of the network realization issue on the visualization of the logical network along with a request for the instruction to perform the second remediation action.

8. A non-transitory computer-readable storage medium that includes a set of instructions which, in response to execution by a processor of a computer system, cause the processor to perform a method of logical network health check, wherein the method comprises:

obtaining network configuration information identifying multiple configurations associated with a logical network on which multiple virtualized computing instances are deployed;

obtaining network realization information identifying how the multiple configurations are realized on multiple hosts supporting the logical network and the multiple virtualized computing instances;

processing the network configuration information and the network realization information to determine:

(a) network configuration health information specifying a network configuration issue associated with the logical network and a first remediation action; and (b) network realization health information specifying a network realization issue associated with the logical network and a second remediation action, wherein the network realization issue includes an inconsistency between a configured attribute for the logical network and a realized attribute for the logical network;

providing, to a user device, first and second user interfaces (UIs) to respectively display the network configuration health information and the network realization health information along with corresponding first and second network topology graphs that provide a visualization of the logical network, wherein the first and second network topology graphs illustrate the multiple virtualized computing instances and how the multiple virtualized computing instances are connected via logical elements deployed on the logical network, wherein the first network topology graph shows a first location of the network configuration issue in the logical network, and wherein the second network topology graph shows a second location of the network realization issue in the logical network; and in response to detecting an instruction initiated by the user device using the first UI or the second UI, respectively performing the first remediation action or the second remediation action.

9. The non-transitory computer-readable storage medium of claim 8, wherein processing the network configuration information and the network realization information comprises:

determining the network configuration health information that specifies the network configuration issue affecting one of the multiple virtualized computing instances or a logical element amongst the logical elements deployed on the logical network, wherein the logical element is a logical switch, a logical switch port, a logical router, or a logical router port.

10. The non-transitory computer-readable storage medium of claim 9, wherein performing the first remediation action comprises:

reconfiguring the logical element affected by the network configuration issue in the logical network.

11. The non-transitory computer-readable storage medium of claim 8, wherein the inconsistency between the configured attribute for the logical network and the realized attribute for the logical network comprises:
an inconsistency between a configured attribute and a realized attribute associated with one of the multiple virtualized computing instances or a logical element amongst the logical elements deployed on the logical network.

12. The non-transitory computer-readable storage medium of claim 11, wherein performing the second remediation action comprises:
resolving the inconsistency between the configured attribute and the realized attribute associated with the one of the multiple virtualized computing instances or the logical element deployed on the logical network.

13. The non-transitory computer-readable storage medium of claim 8, wherein processing the network configuration information and the network realization information comprises:
determining the network realization health information specifying the realization issue as a connectivity issue between a first virtualized computing instance and a second virtualized computing instance that are connected via the logical elements deployed on the logical network.

14. The non-transitory computer-readable storage medium of claim 8, wherein providing the first and second UIs comprises at least one of:
providing the first UI to display a warning of the network configuration issue on the visualization of the logical network along with a request for the instruction to perform the first remediation action; and
providing the second UI to display a warning of the network realization issue on the visualization of the logical network along with a request for the instruction to perform the second remediation action.

15. A computer system, comprising:
a processor; and
a non-transitory computer-readable medium having stored thereon instructions that, in response to execution by the processor, cause the processor to:
obtain network configuration information identifying multiple configurations associated with a logical network on which multiple virtualized computing instances are deployed;
obtain network realization information identifying how the multiple configurations are realized on multiple hosts supporting the logical network and the multiple virtualized computing instances;
process the network configuration information and the network realization information to determine:
(a) network configuration health information specifying a network configuration issue associated with the logical network and a first remediation action; and
(b) network realization health information specifying a network realization issue associated with the logical network and a second remediation action, wherein the network realization issue includes an inconsistency between a configured attribute for the logical network and a realized attribute for the logical network;
provide, to a user device, first and second user interfaces (UIs) to respectively display the network configuration health information and the network realization health information along with corresponding first and second network topology graphs that provide a visualization of the logical network, wherein the first and second network topology graphs illustrate the multiple virtualized computing instances and how the multiple virtualized computing instances are connected via logical elements deployed on the logical network, wherein the first network topology graph shows a first location of the network configuration issue in the logical network, and wherein the second network topology graph shows a second location of the network realization issue in the logical network; and
in response to detecting an instruction initiated by the user device using the first UI or the second UI, respectively perform the first remediation action or the second remediation action.

16. The computer system of claim 15, wherein the instructions that cause the processor to process the network configuration information and the network realization information cause the processor to:
determine the network configuration health information that specifies the network configuration issue affecting one of the multiple virtualized computing instances or a logical element amongst the logical elements deployed on the logical network, wherein the logical element is a logical switch, a logical switch port, a logical router, or a logical router port.

17. The computer system of claim 16, wherein the instructions that cause the processor to perform the first remediation action cause the processor to:
reconfigure the logical element affected by the network configuration issue in the logical network.

18. The computer system of claim 15, wherein the inconsistency between the configured attribute for the logical network and the realized attribute for the logical network comprises:
an inconsistency between a configured attribute and a realized attribute associated with one of the multiple virtualized computing instances or a logical element amongst the logical elements deployed on the logical network.

19. The computer system of claim 18, wherein the instructions that cause the processor to perform the second remediation action cause the processor to:
resolve the inconsistency between the configured attribute and the realized attribute associated with the one of the multiple virtualized computing instances or the logical element deployed on the logical network.

20. The computer system of claim 15, wherein the instructions that cause the processor to process the network configuration information and the network realization information cause the processor to:
determine the network realization health information specifying the realization issue as a connectivity issue between a first virtualized computing instance and a second virtualized computing instance that are connected via the logical elements deployed on the logical network.

21. The computer system of claim 15, wherein the instructions that cause the processor to provide the first and second UIs cause the processor to perform at least one of:
provide the first UI to display a warning of the network configuration issue on the visualization of the logical network along with a request for the instruction to perform the first remediation action; and
provide the second UI to display a warning of the network realization issue on the visualization of the logical network along with a request for the instruction to perform the second remediation action.

\* \* \* \* \*